UNITED STATES PATENT OFFICE.

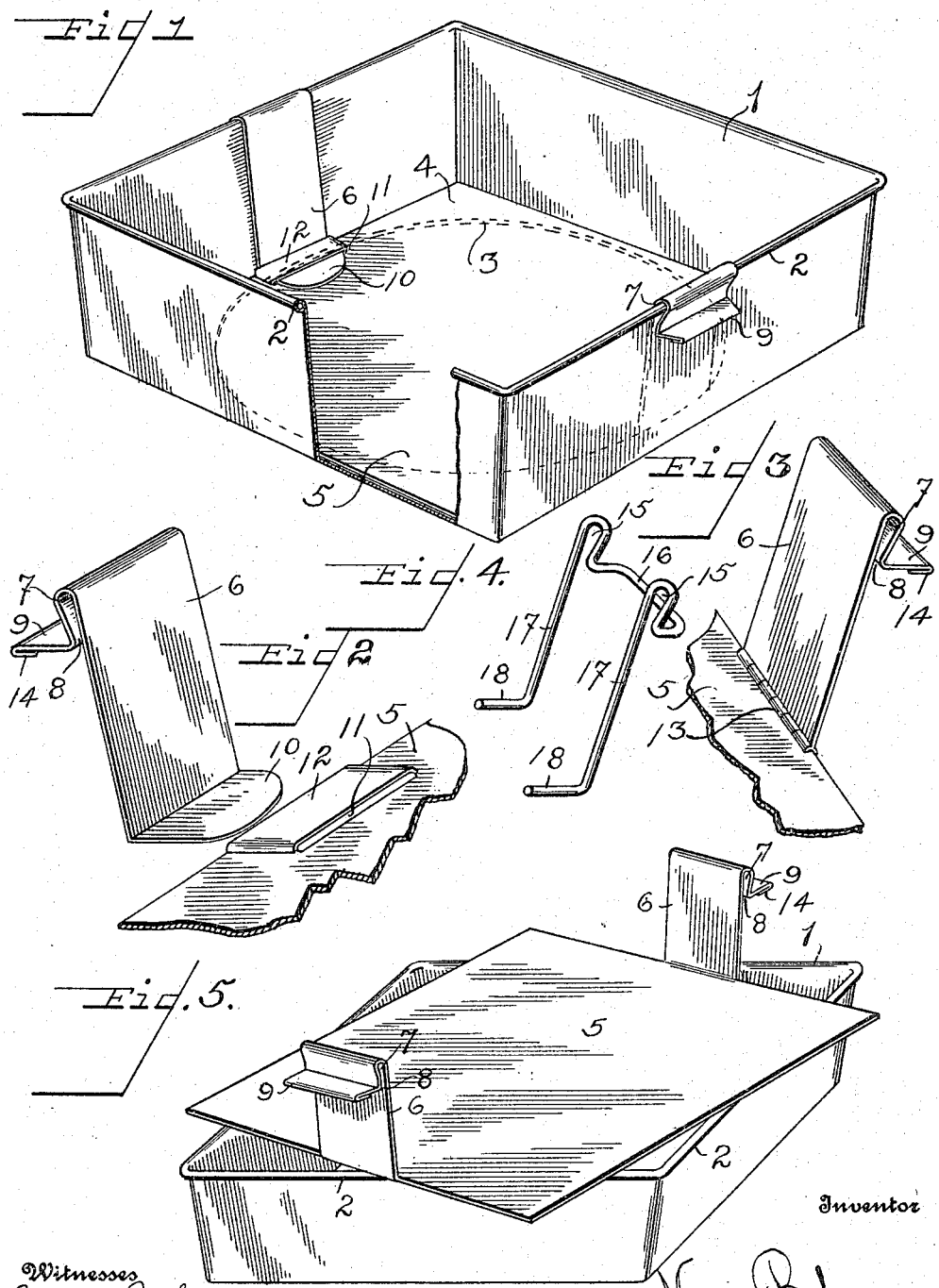

MARY B. JONES, OF SPRINGFIELD, OHIO.

CAKE-PAN.

1,229,280.  Specification of Letters Patent.  Patented June 12, 1917.

Application filed June 21, 1915. Serial No. 35,393.

*To all whom it may concern:*

Be it known that I, MARY B. JONES, citizen of the United States, residing at Springfield, in the county of Clark and State of Ohio, have invented certain new and useful Improvements in Cake-Pans, of which the following is a specification.

My invention relates to kitchen utensils and particularly to pans or containers adapted for cake baking but also applicable to other purposes and more especially pans or containers having detachable bottoms to facilitate the removal of the contents.

The object of the invention is to simplify the structure as well as the means and mode of operation of such devices whereby they will not only be cheapened in construction, but will be more efficient in use, positive in operation, easily and quickly connected and disconnected, and unlikely to get out of repair.

A further object of the invention is to provide a removable support for the cake or other contents of the pan which may be utilized as a permanent support therefor after its removal from the pan and capable of use for cooling purposes.

A further object of the invention is to provide an improved means for detachably engaging the removable bottom with the pan or container and to provide an improved form of lifter for removing the bottom and contents from the pan.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a perspective view of an assembled pan or container forming the subject matter hereof. Fig. 2 is a detail perspective view of one of the detachable lifting and fastening elements together with an adjacent portion of the removable bottom showing the method of engaging one with the other. Fig. 3 is a modification of the construction shown in Figs. 1 and 2 in which the lifting and attaching element is hinged to the removable bottom. Fig. 4 is a detail perspective view of the lifting and attaching element formed from wire. Fig. 5 is a perspective view of the pan or container with the detachable bottom removed therefrom and rested upon the upper edge of the pan in the position to be used in cooling a cake or other body. In this figure the lifting and attaching elements are shown formed integral with the bottom section.

Like parts are indicated by similar characters of reference throughout the several views.

In the drawings, 1 is the pan or container which in the present instance has been shown as rectangular in form and of comparatively shallow depth. It is to be understood, however, that the shape and proportion of the pan or receptacle is immaterial, that it may be of any desired shape or depth. The pan 1 is provided with a marginal bead 2 about its upper edge and is preferably, though not necessarily, provided with an open bottom, as indicated at 3. The opening 3 in the bottom of the pan or receptacle is of less extent than the base area thereof whereby inward extending flanges 4 are formed adjacent to the side walls. Resting upon the bottom of the receptacle or upon the flanges 4 thereof is a detachable bottom 5 upon which the cake or other commodity will rest. Engaged with the bottom 5 at opposite sides thereof and extending upward adjacent to and overhanging the upper edges of the pan 1 are lifter arms 6. The upper end of each arm 6 is bent upon itself to form an inverted U shaped bight 7 having a slightly contracted orifice 8 adapted to grip the bead 2 of the pan. The extremity of each lifter arm 6 is bent outward at substantially right angles to the side of the pan 1 to form finger holds or handles 9 by which the members may be grasped. At its lower end each of the lifter arms is bent inward to form a foot 10 adapted to be introduced through a slot 11 adjacent to the side of the bottom 5. The material intermediate the slot 11 and the marginal edge of the bottom is preferably bent upward or arched as at 12 to facilitate the engagement of the foot 10 therewith and to enable the bottom to rest evenly upon the bottom of the pan 1 or the flanges 4 thereof. In employing the device the feet 10 of the lifter arms are introduced into slots 11 of the bottom and beneath the arch 12 thereof and the bottom 5 with the arms thus detachably engaged therewith is introduced into the pan 1. The sides of the pan prevent the disengagement of the arms and bottom. The lifter arms 6 are pressed downward and the reverse bends or bights 7 thereof are caused to engage or grip the beaded edge 2 of the pan. The cake or other commodity is placed in the pan and baked or cooked in the usual manner. When it is desired to remove the contents of the pan or utensil a knife or spatula is introduced at the sides of the pan to loosen the contents and the terminal extensions 9 of the lifter arms are grasped and pulled upward. This flexes the bights 7 of the lifter arms 6 causing the mouths 8 of such bights or reverse bends to be distended to facilitate the disengagement of the lifters 6 from the bead 2 of the pan. The lifter arms being thus disengaged, the bottom and contents of the pan can be removed by lifting same upward by means of the arms 6. The bottom 5 can be rested upon the upper edge of the pan, as shown in Fig. 5, to cool the cake or other commodity and the lifting members 6 can be disengaged therefrom, leaving the bottom 5 to form a support upon which the cake may rest until used.

In lieu of the tongue and slot condition of the lifting member 6 and the bottom 5 illustrated in Figs. 1 and 2 and heretofore described, the said lifting members may be hinged or pivotally connected to the bottom 5 as shown in detail at 13 in Fig. 3. This construction permits the lifting members to be folded downward when not in use.

In lieu of either of these constructions the lifting members may be formed integral with the bottom 5, as shown in Fig. 5, in which case the lifters project rigidly from the bottom and substantially perpendicular thereto. In each of these forms of device the upper edge of the lifting members is bent in a similar manner to form the reverse bends or bights 7 and the finger grips or handles 9. To avoid rough or raw edges and to improve the appearance of the device the margins of the finger grips or handles 9 may be seamed or bent upon themselves, as at 14. Each of these devices shown in Figs. 1, 2, 3, and 5 is formed from sheet metal in the form of a strip or plate. In lieu of the sheet metal construction, however, the lifting members may each be formed from a single length of wire bent upon itself, as shown in detail in Fig. 4. In this construction the wire is bent upon itself to form two reverse bends or bights 15 adapted to engage the bead 2 of the pan which bends or bights are connected one to the other by a transverse arcuate connecting portion 16 which constitutes the handle or finger grips. The extremities of the wire are extended downward from each bight 15 to form arms 17 which are preferably, though not necessarily, bent at right angles at their lower ends, as at 18, to facilitate their engagement with the bottom 5. This form of wire lifter may be attached to the bottom by thrusting the ends 18 of the arms 17 through perforations in the bottom, similar to the manner of connecting the lifters shown in Figs. 1 and 2 or they may be soldered or electric welded directly to the bottom.

While the device is primarily intended for use in cake pans, it is equally applicable to roasters, boilers or kettles to facilitate the removal of the contents. While the bottom 5 has been shown as a flat continuous plate, it is obvious that it may be perforated or formed of screen to meet different conditions of use. The mere perforating of the plate is so obvious as not to require illustration.

From the above description it will be apparent that there is thus provided a device of the character described, possessing the particular features of advantage before enumerated as desirable but which obviously is susceptible of modification in its form, proportion, detail construction, or arrangement of parts without departing from the principle involved or sacrificing any of its advantages.

While in order to comply with the statute the invention has been described in language more or less specific as to certain structural features, it is to be understood that the means and construction herein described comprise but one mode of putting the invention into effect and the invention is therefore claimed broadly in any of its possible forms or modifications within the scope of the appended claims.

Having thus described my invention, I claim:

1. A receptacle, a removable bottom therefor, arms projecting upward from said bottom, inverted U-shaped bights formed in the arms, said bights having contracted orifices within which the edge of the receptacle is engaged, and laterally projecting extensions adjacent to the bights affording leverage for the flexing of said bights to facilitate the engagement and disengagement of the receptacle therewith.

2. In a kitchen utensil, a receptacle having a beaded edge, a removable bottom in said receptacle, upward extending arms carried by the bottom, said bottom being supported independent of said arms, resilient bights in said arms clasping the edge of the receptacle to normally lock the bottom against removal and handle extensions beyond the bights by which the bights may be flexed to facilitate their engagement with and disengagement from the receptacle.

3. A receptacle, a removable bottom therefor, arms projecting upward from said bottom having therein inverted U-shaped flexible bights the mouths of which are contracted, within which contracted bights the edge of the receptacle is gripped.

4. In a kitchen utensil, a receptacle, a removable bottom for said receptacle having a slot therein, and an L-shaped member projecting upward from the bottom in substantially parallel relation with the side of the receptacle having its lateral arm engaged in the slot in the bottom.

5. In a kitchen utensil, a receptacle, a removable bottom therefor having a slot therein adjacent to the edge of said bottom, the material intermediate the slot and edge of the bottom being projected above the plane of the bottom, and a lifting member engaged beneath the elevated portion of the bottom and extending thence upward to the top edge of the receptacle.

6. In a kitchen utensil, a receptacle, a removable perforated bottom therefor, and an upward extending arm detachably engaged in a perforation in said bottom and yieldingly engaged with the top edge of the receptacle, substantially as and for the purpose specified.

In testimony whereof, I have hereunto set my hand this 16th day of June, A. D. 1915.

MARY B. JONES.

Witnesses:
HARRY W. SNODGRASS,
MARGUERITE SULLIVAN.

Copies of this patent may be obtained for five cents each, by addressing the "Commissioner of Patents, Washington, D. C."